US008371507B2

(12) United States Patent
Haggerty et al.

(10) Patent No.: US 8,371,507 B2
(45) Date of Patent: Feb. 12, 2013

(54) METHOD OF SELECTIVELY PROJECTING SCAN LINES IN A MULTIPLE-LINE BARCODE SCANNER

(75) Inventors: Thomas Haggerty, Blackwood, NJ (US); Robert H. Brady, Brookfield, CT (US)

(73) Assignee: Metrologic Instruments, Inc., Blackwood, NJ (US)

( * ) Notice: Subject to any disclaimer, the term of this patent is extended or adjusted under 35 U.S.C. 154(b) by 1089 days.

(21) Appl. No.: 11/868,953

(22) Filed: Oct. 8, 2007

(65) Prior Publication Data

US 2009/0095814 A1    Apr. 16, 2009

(51) Int. Cl.
*G02B 5/00*         (2006.01)
(52) U.S. Cl. ............ 235/462.32; 235/462.39; 359/200.7
(58) Field of Classification Search .............. 235/462.32
See application file for complete search history.

(56) References Cited

U.S. PATENT DOCUMENTS

| 4,723,100 | A  | * | 2/1988  | Horikawa et al. ........ 318/400.41 |
| 5,912,450 | A  |   | 6/1999  | Katz et al. |
| 6,005,320 | A  | * | 12/1999 | Kim et al. ................. 310/156.36 |
| 6,184,647 | B1 |   | 2/2001  | Oguro et al. |
| 6,188,500 | B1 |   | 2/2001  | Rudeen et al. |
| 6,247,647 | B1 | * | 6/2001  | Courtney et al. ......... 235/462.36 |
| 6,275,319 | B1 | * | 8/2001  | Gadhok ..................... 359/198.1 |
| 6,715,681 | B2 |   | 4/2004  | Dvorkis |
| 6,857,572 | B2 |   | 2/2005  | Martin et al. |
| 7,097,463 | B2 |   | 8/2006  | Hsiao et al. |
| 7,255,280 | B2 |   | 8/2007  | Blake et al. |
| 7,431,215 | B2 |   | 10/2008 | Wilz, Sr. et al. |
| 7,523,867 | B2 |   | 4/2009  | Martin et al. |

FOREIGN PATENT DOCUMENTS

JP          06059348 A   *   3/1994

* cited by examiner

*Primary Examiner* — Thien M Le
*Assistant Examiner* — Tae Kim
(74) *Attorney, Agent, or Firm* — Summa, Additon & Ashe, P.A.

(57) ABSTRACT

A method of selectively generating one or more scan lines from a multi-scan line scanner involves measuring the pulse widths of the pulses in a signal output of a motor driving the polygon mirror of the scanner wherein the signal relates to the position of the polygon's mirror facets. By measuring and distinguishing each of the pulses in the signal, the illumination of the scan beam can be synchronized with the rotation of the polygon mirror to only generate a desired number of scan line patterns that is less than the full complement of the scan line patterns capable of being generated by the multi-scan line scanner.

8 Claims, 8 Drawing Sheets

METHOD OF SELECTIVELY PROJECTING SCAN LINES IN A MULTIPLE-LINE BARCODE SCANNER

FIELD OF THE INVENTION

The present invention relates to barcode scanners and particularly to a method of selectively generating one or more scan lines from a multiple scan line barcode scanner.

BACKGROUND

Referring to FIG. 6, one type of a typical multiple scan line barcode reader 100, such as those used in many fixed scanners, is described. The multiple scan lines are generated by the use of a spinning polygon mirror 110. The polygon mirror 110 has a plurality of facet mirrors 111, 112, 113, 114 arranged at different tilt angles forming the sides of the polygon. A reading scan beam 160 generated from a scanning beam source 150, such as a laser diode for example, passes through an aperture in a mirror 154 and is directed onto the polygon mirror 110 by a collection lens 156 while the polygon mirror rotates. The mirror 154 gathers the return scan beam reflected from a barcode symbol and focuses it onto a photo sensor 158 for the purpose of decoding the barcode symbol.

As the polygon mirror 110 rotates, the scan beam 160 is reflected by each facet mirror onto one or more of down stream pattern mirrors 170, . . . 176 that are arranged around the polygon mirror 110. Each of the down stream pattern mirrors project the scan beam into a different area of the scan volume creating a scan line. By providing the multiple pattern mirrors 170, . . . 176 positioned at various angles about the rotating polygon mirror 110 a desired number of scan lines can be projected into the scan volume. The polygon mirror is typically driven by a brushless DC (BLDC) motor.

In some modern barcode reading applications, such multi-scan line barcode readers are provided as a modular dual-mode hands-free unit. Such dual-mode hands-free scanners operate as a multi-scan line fixed scanner as well as a single scan line hand-held barcode scanner. In the fixed scanner mode, the scanner is positioned in a designated place scanning the scan volume with the multiple scan lines. In the hand-held mode, if necessary, the scanner can be configured to project only one of the multiple scan lines into the scan volume allowing the user to use it as a traditional single scan line hand-held scanner.

In conventional dual-mode scanners, the single scan line mode is implemented by incorporating a device, external to the BLDC motor driving the polygon mirror, to detect the angular position of the polygon mirror and turning the reading scan beam on and off synchronized with the polygon mirror so that only the scan beam that is reflected by a desired mirror facet is projected into the scan volume. This produces a single scan line.

In many cases the external device used to detect the position of the polygon mirror is an external Hall Effect sensor. However, the use of such external sensor device also requires mounting a magnet on the polygon mirror. The use of such extra hardware increases the manufacturing cost of such dual-mode barcode scanners.

Therefore, a further improvement is desired in dual-mode barcode scanners.

SUMMARY

According to an embodiment, a method of selectively generating one or more scan lines from a multiple-scan line scanner having a rotating polygon mirror is disclosed. The polygon mirror is rotated by a motor and the scanner comprises a scan beam source generating a reading scan beam. The motor generates a signal pulse train comprising sequential sets of two or more binary signal pulses per revolution of the motor. Each of the pulses has a different pulse width that is a characteristic of the motor. The method includes measuring the pulse widths of the pulses then distinguishing each of the pulses by their measured pulse widths, wherein one of the pulses in a set of two or more binary signal pulses per revolution of the motor have a predetermined home transition point associated therewith. Next, at least one set of start and stop times for turning the reading scan beam on and off is determined in relation to the home transition point, wherein each set of the start and stop times is correlated to a selected mirror facet of the polygon mirror and the selected mirror facet's position. Once the start and stop times are determined, the reading scan beam source is illuminated only during a time interval defined by the at least one set of start and stop times. This results in the multi-scan line scanner generating a scan line pattern per set of the start and stop times. Each scan line pattern generated is repeatably in a same position each time the scanner is switched to the single-scan line mode or powered on.

According to another embodiment, the motor rotating the polygon mirror is a motor having two magnetic poles and generates a signal pulse train comprising sequential sets of two binary signal pulses per revolution of the motor. Each of the two pulses has different pulse widths that are a characteristic of the motor. The method includes measuring the pulse widths of the two pulses then distinguishing the two pulses by their measured pulse widths, wherein one of the two pulses have a predetermined home transition point associated therewith. Next, at least one set of start and stop times for turning the reading scan beam on and off is determined in relation to the home transition point, wherein each set of the start and stop times is correlated to a selected mirror facet of the polygon mirror and the selected mirror facet's position. Once the start and stop times are determined, the reading scan beam source is illuminated only during a time interval defined by the at least one set of start and stop times. This results in the multiple-scan line scanner generating a scan line pattern per set of start and stop times that is repeatably in a same position each time the scanner is switched to the single-scan line mode or powered on.

According to an aspect of the invention, the method described herein enables controlling a multiple-scan line barcode scanner to selectively turn on or project one scan line or any number and any particular combination of scan lines from the full complement set of the scan lines available in the scanner by selectively turning the scan beam source on and off at selected points in a full rotation of the polygon mirror. For example, if the particular multiple-scan line scanner's full scan pattern has 20 scan lines, the method described herein can be used to turn on (i.e. selectively project) any number of scan lines less than 20 and also allow any particular scan line or lines to be selectively turned on from that group of scan lines.

In a preferred embodiment the motor rotating the polygon mirror is a brushless DC motor. This is because brushless DC motors generally have internal Hall Effect sensors generating an output of binary signal pulse train for commutating that can be readily utilized in implementing the present method. However, the method described herein is equally applicable in systems utilizing any other types of motor whether brushless or brushed as long as the motor is a type that outputs a signal that relates to the motor shaft position which, in turn, has a fixed relationship to the position of the mirror facets on the polygon mirror. As long as the signal comprises two or more pulses per revolution of the motor and each pulse has different pulse width allowing the pulses to be distinguished the present method can be applied.

BRIEF DESCRIPTION OF THE DRAWINGS

The features of the preferred embodiments will be described with reference to the following drawings where like elements are labeled similarly, and in which.

Figure 1:
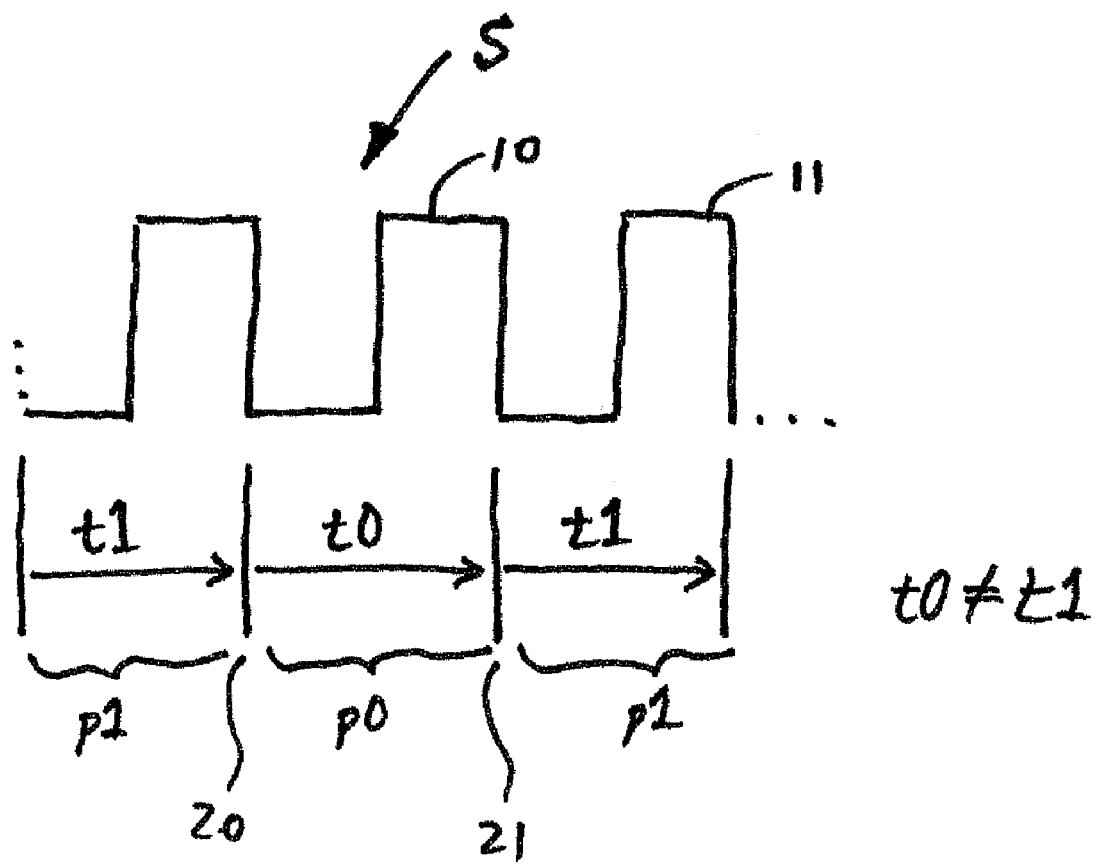
FIG. 1 is a schematic illustration of a binary signal pulse train generated by an internal Hall Effect sensor of a BLDC motor according to an embodiment of the invention.

All drawings are schematic and are not drawn to scale.

DETAILED DESCRIPTION

This description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. The terms "circuitry" or "circuit" as used herein means any combination of hardware, firmware, or software used to implement the functions or control of component(s) described herein. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

According to an embodiment of the invention, a method of generating a consistently and accurately positioned single-scan line pattern from a rotating polygon mirror type multi-scan line scanner involves utilizing the binary signal pulse train output of the brushless DC motor (BLDC) that rotates the polygon mirror. The polygon mirrors are generally driven by a BLDC motor, typically two-pole (magnetic poles) types, and produces two binary signal pulses per revolution. Each pulse represents the magnetic pole positions of the BLDC motor. The pulse train is generated by the motor's internal Hall Effect sensor and the pulses are used internally by the BLDC motor's control circuitry for commutation purposes.

The pulses are generated each time a magnetic pole of the motor's rotor passes by the internal Hall Effect sensor as the rotor rotates. The positions of the magnetic poles are not absolutely perfect because of the unavoidable tolerances and variability in the manufacturing/assembly process of the motors. This imperfect positioning of the magnetic poles is thus a characteristic of the motors. This imperfect positioning of the magnetic poles means that the lengths of the arcs traversed by each of the magnetic poles to pass by the internal Hall Effect sensor measured from the time when the other magnetic pole passes by the Hall Effect sensor are not equal in length. This discrepancy could be the result of a number of physical and assembly variations. For example, the two poles may not be in exactly symmetrical positions (i.e. not being exactly 180° apart) or the permanent magnets may not have the same size and the result is that one of the two poles has to traverse an arc that spans greater than 180° while the other pole traverses an arc that spans less than 180°. Thus, for the two poles generating the two pulses per revolution pulse train, the pulse width of each of the two pulses will be different. The pulse width is defined herein as the temporal width (i.e. time interval) between same-edge transitions of the pulse train output of the motor during a single revolution.

Because the angular positions of the mirror facets of the polygon mirror are fixed with respect to the BLDC motor's rotor and, in turn, to the magnetic poles of the rotor, by correlating the binary signal pulses to a magnetic pole of the motor and in turn to the position of the particular mirror facets on the polygon mirror a partial scan pattern that will generate a single scan line can be generated accurately and repeatably in relation to the binary signal pulses. A "partial scan pattern" refers to illuminating the reading scan beam of the multi-scan line scanner only during a part of the polygon mirror's full rotation just long enough and at the appropriate time and for appropriate duration so that only one of the multiple scan lines of the polygon mirror is generated. This is achieved by the method disclosed herein by coordinating or timing the start and stop points for illuminating the reading scan beam to the pulse train output of the BLDC motor.

FIG. 1 is a schematic illustration of the binary signal pulse train S generated by the internal Hall Effect sensor (not shown) of the BLDC motor as the motor's rotor rotates. The two magnetic poles of the BLDC motor's rotor causes the Hall Effect sensor to generate two pulses p0 and p1 per revolution, corresponding to each of the two magnetic poles. Thus, as the motor spins, the generated pulse train S is a repeat of the two pulses p0, p1, p0, p1, p0, p1 . . . The pulses' peaks 10, 11 represent the magnetic poles passing by the internal Hall Effect sensor.

The time intervals t0 and t1 represent the time intervals between each of the two poles passing the internal Hall Effect sensor and can be defined by two consecutive same-edge transition points in the signal train S. In other words, either the falling edge transition points or the rising edge transition points in the signal train can be used to define and measure the time intervals t0, t1. The selection of which edge transition point is used is arbitrary. In this example, the time intervals t0 and t1 are defined by the falling-edge transition points 20 and 21. Because the two magnetic poles in the BLDC motor's rotor are not exactly 180° apart, the arc traveled by one of the poles from the point the other pole passes the Hall Effect sensor will shorter than the corresponding arc traveled by the other pole. In other words, t0 and t1 are not equal.

Figure 2:
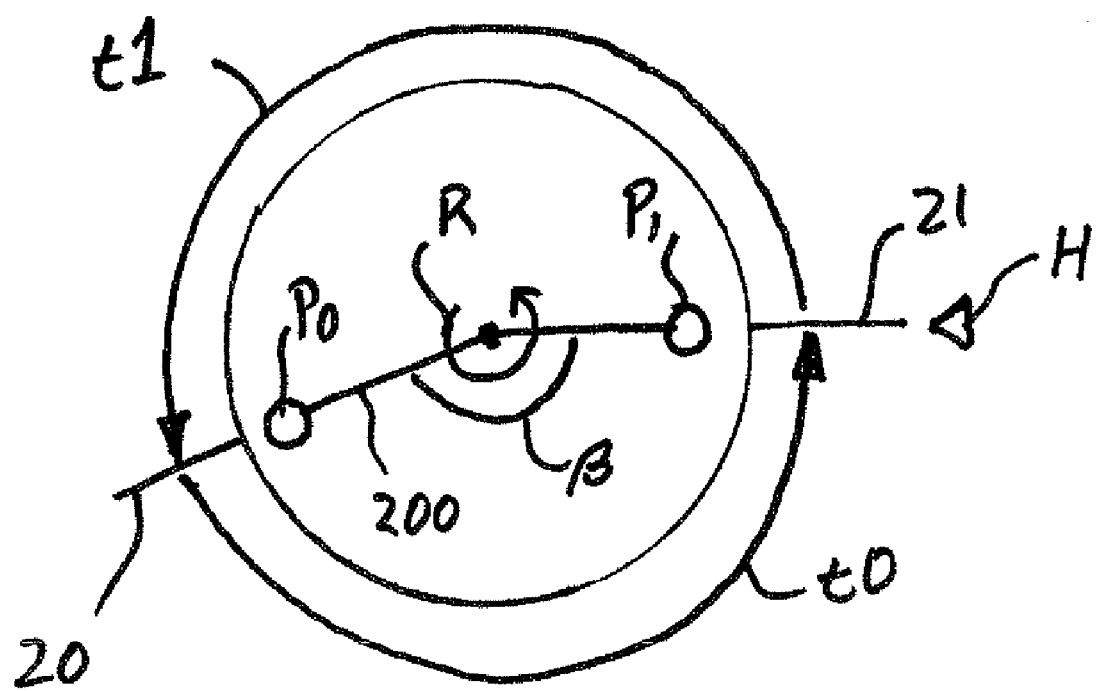
FIG. 2 is a schematic illustration of the time intervals t0 and t1 from FIG. 1 graphically illustrating the arc traversed by each of the two corresponding magnetic poles of the BLDC motor's rotor.

FIG. 2 is a schematic illustration of the time intervals t0 and t1 graphically illustrating the arc traversed by each of the two corresponding magnetic poles P0 and P1 of a rotor 200 of a BLDC motor driving the polygon mirror 110 in the multiscan line scanner 100. The location of the internal Hall Effect sensor is represented by H. The poles P0 and P1 are not positioned on the rotor 200 exactly 180° apart and thus the angle β between the poles is less than 180°. Thus, as the rotor 200 rotates in the direction of the arrow R, the time interval t0 representing the time between the pole P1 passing the Hall Effect sensor H (the falling edge transition point 21 in the signal train) to the pole P0 passing the Hall Effect sensor H (the falling edge transition point 20 in the signal train) is smaller than the time interval t1.

Therefore, by measuring the time intervals t0 and t1 in the signal train S, one can correlate or identify each of the two magnetic poles P0, P1 with one of the two pulses p0 and p1. The time intervals t0 and t1 can be measured by a timer circuit that is already provided in the barcode scanner's microcontroller. The term "microcontroller" is used herein to refer to a microprocessor or other computing devices that is provided in the barcode scanner to control the scanner's operation. The timer circuit would measure the intervals between the same-edge transition points in the signal pulse train S. In this example, the falling edge transition points 20 and 21 define the pulse widths or the time intervals t0 and t1.

Figure 3:
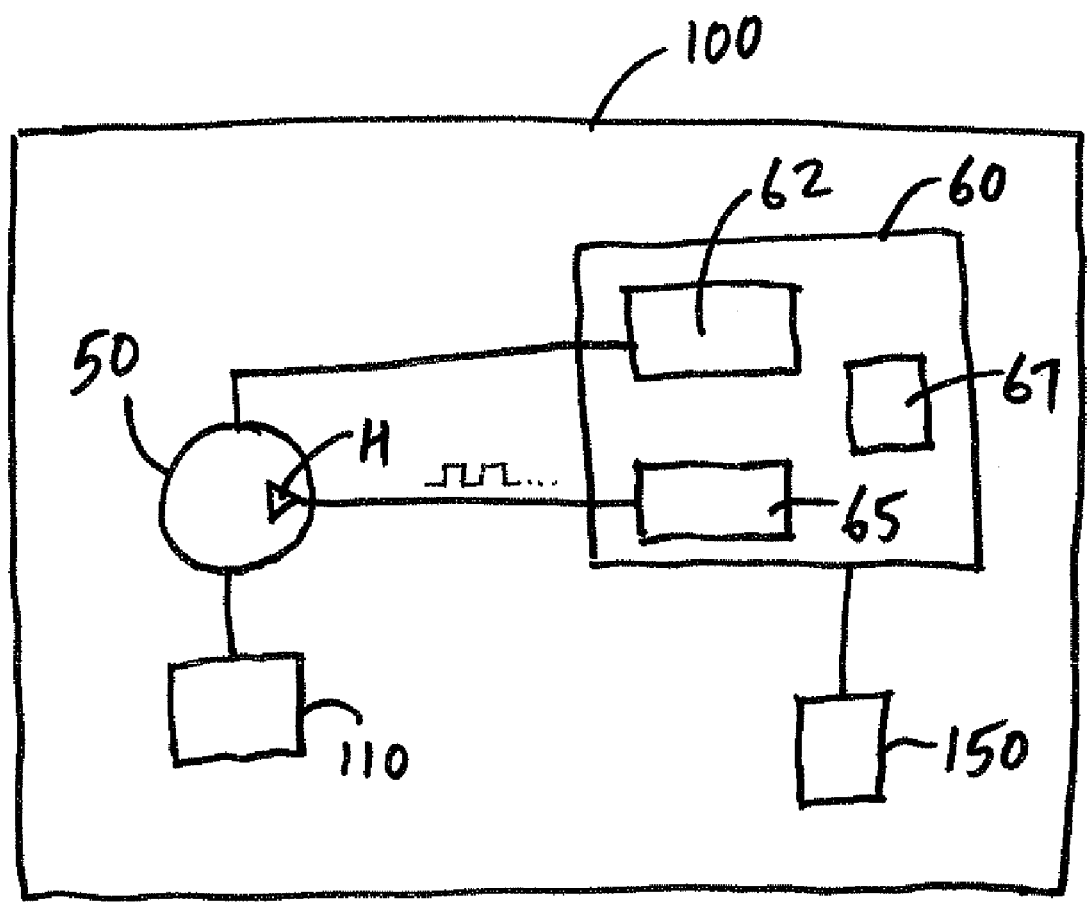
FIG. 3 is a schematic illustration of the barcode scanner according to an embodiment of the invention.

FIG. 3 is a schematic illustration of the barcode scanner 100 showing some of the components involved in measuring the pulse widths of the binary signal pulse train S generated by the BLDC motor 50. The barcode scanner 100 comprises a BLDC motor 50 that drives the rotation of the polygon mirror 110 and a reading scan beam source 150. The barcode scanner 100 also comprises a microcontroller 60 for controlling the operation and various functions of the barcode scanner. The microcontroller 60 includes a BLDC motor control circuit 62 for controlling the operation of the BLDC motor 50. The microcontroller 60 also includes a timer circuit 65 that monitors and measures the pulse widths of the pulse train S generated by the Hall Effect sensor H of the BLDC motor 50. The microcontroller 60 is connected to the reading scan beam source 150 and is configured to turn the scan beam source 150 on or off. The timer circuit 65 would need appropriate accuracy to measure the temporal pulse widths between signal transitions. The microcontroller 60 also generally includes an oscillator 67 to control the operating frequency of the microcontroller and the clock speed of the timer circuit 65.

According to an aspect of the invention, the method used to determine the relationship of the magnetic poles' arcs, each of which is measured once per revolution of the rotor 200, is implemented by a voting algorithm. The voting algorithm utilizes a single counter, hysteresis counter that is incremented or decremented depending on whether the currently measured temporal pulse width is consistent with the currently presumed order of the two pulses. The hysteresis counter prevents errors in the presumed ordering of the pulse widths due to random errors in the measurements and minor speed variations. If the counter is ever decremented below the value zero, the presumed ordering of the pulse widths is reversed, and the algorithm continues to the next measurement. If the second presumed ordering is inconsistent with the latest measurement and the hysteresis counter is currently "0", then the algorithm will reverse the presumed order again. The count for the hysteresis counter will remain "0" until the next measurement is received. Depending upon what that next measurement is, either the counter will increment, increasing the likelihood that the new (initial) ordering is correct, or the presumed ordering will be reversed yet again and the count will remain at "0." It should be noted, however, that it is highly unlikely that the presumed ordering will continue to flip back and forth as this would only happen if every measurement disagreed with the preceding measurement. The disagreement would only happen when there is a rare variance in the speed of the motor resulting in inaccurate pulse width measurements.

The algorithm may be extended to support a rotating component that outputs three or more binary signal pulses by using multiple hysteresis counters. For example, a BLDC motor whose rotor has three or more magnetic poles would generate corresponding number of binary signal pulses per revolution of the rotor. The method described herein would also work with not only a BLDC motor but with other types of electric motors such as brushed motors but that may require adding an internal Hall Effect sensor to the motor because unlike BLDC motors, brushed electric motors do not generally have internal Hall Effect sensors.

TABLE 1 below illustrates the voting algorithm using an example of a BLDC motor's rotor 200 in which the actual temporal pulse width t0 is shorter than the temporal pulse width t1 and what might occur during the initial stages of the voting algorithm distinguishing the two pulses. In a barcode scanner, this voting algorithm can be running continuously while the scanner is on or executed only when the scanner's single-scan line mode is turned on.

TABLE 1

| | pulse measured | measured t0 | measured t1 | hysteresis counter | presumed shorter pulse width |
|---|---|---|---|---|---|
| | initial state | 65535 | 65535 | 0 | pulse-0 |
| 1st Revolution | pulse-0 | 4000 | 65535 | 1 | pulse-0 |
| | pulse-1 | 4000 | 3994 | 0 | pulse-0 |
| 2d Revolution | pulse-0 | 4012 | 3994 | 0 | pulse-1 |
| | pulse-1 | 4012 | 4025 | 0 | pulse-0 |
| 3d Revolution | pulse-0 | 4005 | 4025 | 1 | pulse-0 |
| | pulse-1 | 4005 | 4028 | 2 | pulse-0 |
| 4th Revolution | pulse-0 | 3995 | 4028 | 3 | pulse-0 |
| | pulse-1 | 3995 | 4019 | 4 | pulse-0 |
| | pulse-0 | 4002 | 4019 | 5 | pulse-0 |

Initially, one of the two pulses, either the first pulse measured or the second pulse measured, is arbitrarily presumed to be the shorter one. In this example, the first pulse to be measured, denoted by the designation "pulse-0" is initially presumed to have the shorter temporal pulse width. During the first revolution of the rotator, the temporal pulse width t0 of pulse-0 is measured to be 4000 clock units. The clock units refer to the clock cycles of the microcontroller's clock (i.e. the oscillator) and the absolute value of the unit is not important. The initial value for the temporal pulse width t1 for the second pulse is some random value 65535. Since the initial value of t1 is greater than the 4000 clock units measured for t0, the initial presumption holds true and the hysteresis counter is incremented to "1." Next, in the latter half of the first revolution, the temporal pulse width of the second pulse "pulse-1" is measured to be 3994 clock units. Since this newly measured value for t1 is smaller than t0, opposite of the initial presumption, the hysteresis counter is decremented to zero. Although the latest measured values did not agree with the initially presumed ordering rank of the pulse widths, because the hysteresis counter was not zero at the beginning of this step, the presumed ordering of the pulse widths is maintained.

In the second revolution, the temporal pulse width t0 of the first pulse, pulse-0, is measured to be 4012 clock units. Because t1 is still less than t0, opposite of the presumed pulse width ordering, the hysteresis counter would normally be decremented. However, since the counter is zero and cannot go negative, it is left at zero, the presumed ordering of the pulse widths is reversed and the second pulse, pulse-1, is now presumed to be the shorter one. Next, the temporal pulse width t1 of the second pulse, pulse-1, is measured to be 4025 clock units. Now t0 (4012 clock units) is smaller than t1, in conflict with the new presumed ordering. Thus, the hysteresis counter is left at zero. The presumed ordering of the pulse widths is returned to the initially presumed ordering, that is the first pulse, pulse-0, being the smaller one. The hysteresis counter is restricted to non-negative values. Thus, the counter can never be decremented below zero. If the counter is zero and the latest measurement does not agree with the presumed ordering, the algorithm changes the presumed ordering but leaves the counter at zero. When the next measurements are made, the exact same logic applies, except that the presumed ordering has been changed from the previous iteration.

In the third revolution, the temporal pulse width t0 of pulse-0 is measured to be 4005 clock units. Because t0 is smaller than t1 (4025 clock units), the hysteresis counter is incremented to "1" and the presumed ordering is maintained as initially presumed. In the second half of the third revolution, the temporal pulse width t1 of pulse-1 is measured to be 4028 clock units. Because t0 (4005 clock units) is smaller than t1, the hysteresis counter is incremented to "2" and the presumed ordering remains the same.

In the fourth revolution, the temporal pulse width to of pulse-0 is measured to be 3995 clock units. Because to is smaller than t1 (4028 clock units), the hysteresis counter is incremented to "3" and the presumed ordering remains the same. In the second half of the fourth revolution, the temporal pulse width t1 of pulse-1 is measured to be 4019 clock units. Because t0 (3995 clock units) is smaller than t1, the hysteresis counter is incremented to "4" and the presumed ordering remains the same.

After several iterations, it quickly becomes apparent which of the two pulse widths is actually shorter. At the same time, the algorithm effectively handles any anomalies in the measured data. For example, in the example shown in Table 1, the temporal pulse width t1 of pulse-1 measured during the first revolution is an anomaly because the value of t1 was smaller than t0. This could have been caused by a variation in the speed of the BLDC motor. But the measurements made in the subsequent revolutions confirmed the initial presumption of the ordering and the pulse-0 was correctly determined as the one with shorter temporal pulse width.

The longer the algorithm runs, the more reliable the shortest-pulse determination becomes. This information may then be used to generate events at times relative to occurrence of an arbitrarily-chosen "home" pulse or "home" transition point in the signal pulse train S. For example, having distinguishably identified the two pulses in the binary signal pulse train S, this information can be used in combination with the calibrated start/stop angles, $\alpha_{start}$ and $\alpha_{stop}$, created during the calibration step so that the barcode scanner 100 can readily switch from a multi-scan line mode to a single-scan line mode. The calibration process is described in more detail below. To operate in a single-scan line mode, the microcontroller 60 of the barcode scanner 100 will turn the reading scan beam source 150 on and off synchronously with the time intervals corresponding to the start/stop angles, $\alpha_{start}$ and $\alpha_{stop}$, the time intervals being measured from the predesignated "home" transition point in the binary signal pulse train S. Meaning that if home reference pulse were determined to be the shorter of the two pulses during the calibration process, and the "home" transition point was chosen to be the falling-edge transition point of the shorter pulse, as the shorter pulse is determined through the voting algorithm, which turned out to be the pulse-0 in the example of TABLE 1, the start and stop time intervals are measured from the falling-edge transition point of the most recently measured pulse-0. In a particular application, if one or both of the time intervals corresponding to the start and stop angles, $\alpha_{start}$ and $\alpha_{stop}$, were to be longer than the pulse duration of the home reference pulse, the time intervals can be measured from the latest transition point rather than the "home" transition point. This example is further discussed below in reference to FIGS. 5A and 5B.

During the initial calibration of the barcode scanner, the voting algorithm described above is first used to identify the two pulses p0 and p1 by their measured pulse widths t0 and t1, respectively. Then one of the two is arbitrarily designated as being a home reference pulse and the position of a desired facet mirror of the polygon mirror 110 is correlated to the home reference pulse. Because the pulses correspond to the magnetic poles of the motor's rotor 200, making the correlation between one of the pulses and the desired facet mirror of the polygon mirror 110 enables the scanner to select a particular position of the desired facet mirror by using the correlated home reference pulse as the timing reference.

Once the correlation is made, the magnetic poles of the rotor 200 can be tagged or identified as P0 and P1 corresponding to the pulses p0 and p1. During calibration, the two magnetic poles are distinguished by the difference in their temporal pulse widths. The fact that the pulse widths are different is used for identifying the particular pole between the two poles.

During the calibration process, the angles, $\alpha_{start}$ and $\alpha_{stop}$, are determined to correspond to the edges of the mirror facets of the polygon mirror 110 used to draw a single-line scan pattern. The angles are measured from the position of one of the poles corresponding to the start of a pulse time interval to or t1 (i.e. pulse widths). Which of the two pulse time intervals to or t1 gets used depends on which pulse is designated as the home reference pulse. The angles, $\alpha_{start}$ and $\alpha_{stop}$, are converted into start and stop time intervals $T\alpha_{start}$ and $T\alpha_{stop}$ (preferably measured in the microcontroller's clock units) measured from one of the edge transition points of the home reference pulse that is arbitrarily designated as the "home" transition point. In other words, if the falling edge transition point 20 were designated as the "home" transition point, the barcode scanner's scan beam source 150 should be turned on when the rotor 200 has rotated $\alpha_{start}$ from the falling edge transition point 20 (i.e., at interval $T\alpha_{start}$ from the transition point 20) and turned off when the rotor 200 has rotated $\alpha_{stop}$ from the falling edge transition point 20 (i.e., at interval $T\alpha_{stop}$ from the transition point 20) during each revolution of the rotor 200.

Then, during normal operation of the barcode scanner 100, when the end user switches the barcode scanner 100 from a multi-scan line mode to a single-scan line mode, the barcode scanner's microcontroller measures the pulse widths ti of the signal train S and quickly identifies pulses p0 and p1 using the algorithm described above. Once the pulses p0 and p1 are identified, the microcontroller can identify the "home" transition point 20. The microcontroller, then, turns the scan beam source 150 on and off illuminating the scan beam only during a time interval defined by the predetermined start and stop angles, $\alpha_{start}$ and $\alpha_{stop}$, with respect to the "home" transition point 20 of the pulses, thus generating a single-scan line pattern. The scan beam source 150 is turned on when a time duration defined by the start time interval $T\alpha_{start}$ has passed from the "home" transition point 20 and turned off when a time duration defined by the stop time interval $T\alpha_{start}$ has passed from the "home" transition point 20.

Figure 4A:
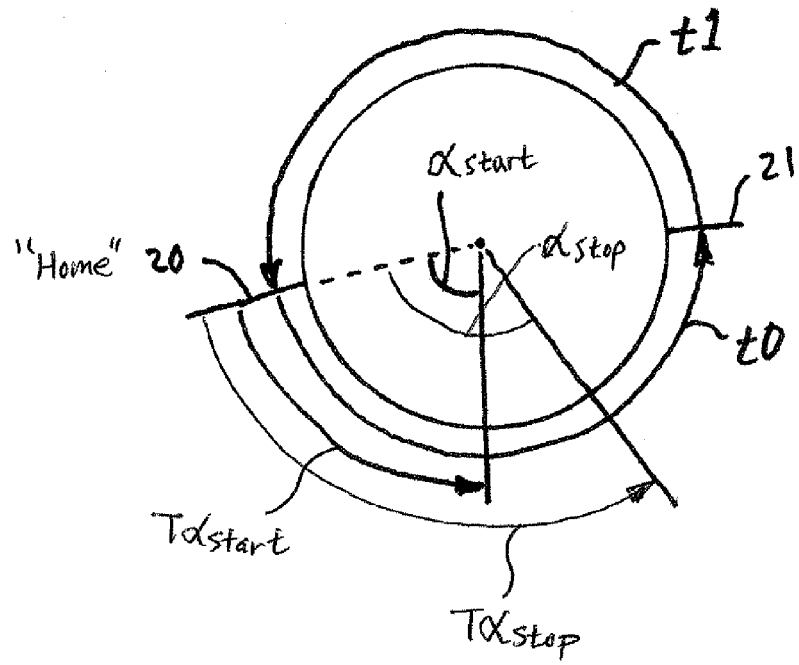
FIGS. 4A and 4B are schematic illustrations showing the relationship between the calibrated angles, $\alpha_{start}$ and $\alpha_{stop}$, and the time intervals $T\alpha_{start}$ and $T\alpha_{stop}$ according to an embodiment of the invention.
Figure 4B:
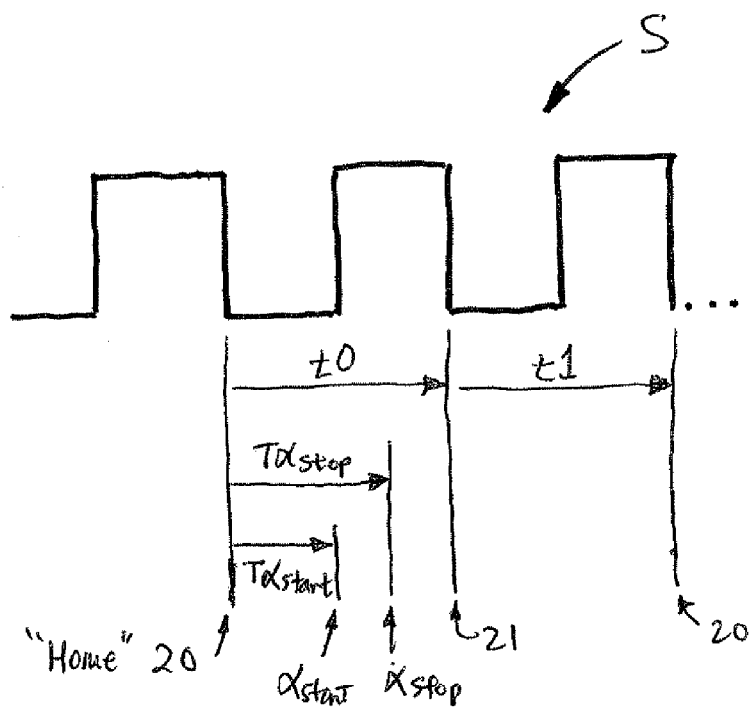

The relationship between the calibrated angles, $\alpha_{start}$ and $\alpha_{stop}$, and the corresponding start/stop time intervals $T\alpha_{start}$ and $T\alpha_{stop}$ is illustrated by FIGS. 4A and 4B. Similar to FIG. 2, FIG. 4A shows the time intervals t0 and t1 graphically overlaid on the arc traversed by each of the two corresponding magnetic poles. As in FIG. 2, the signal pulse train's edge transition points 20, 21 are shown noting the starting points for the pulse width intervals t0 and t1, respectively. The calibrated angles, $\alpha_{start}$ and $\alpha_{stop}$, and the corresponding time intervals $T\alpha_{start}$ and $T\alpha_{stop}$ are shown as being measured from the "home" transition point 20. In this example, the start/stop angles, $\alpha_{start}$ and $\alpha_{stop}$, and the corresponding time intervals $T\alpha_{start}$ and $T\alpha_{stop}$ fall within a single pulse p0. FIG. 4B is another illustration showing the relationship between the pulses p0, p1 and the calibrated angles, $\alpha_{start}$ and $\alpha_{stop}$, and the corresponding time intervals $T\alpha_{start}$ and $T\alpha_{stop}$ presented linearly superimposed with the profile of the binary signal pulse train S.

Figure 5A:
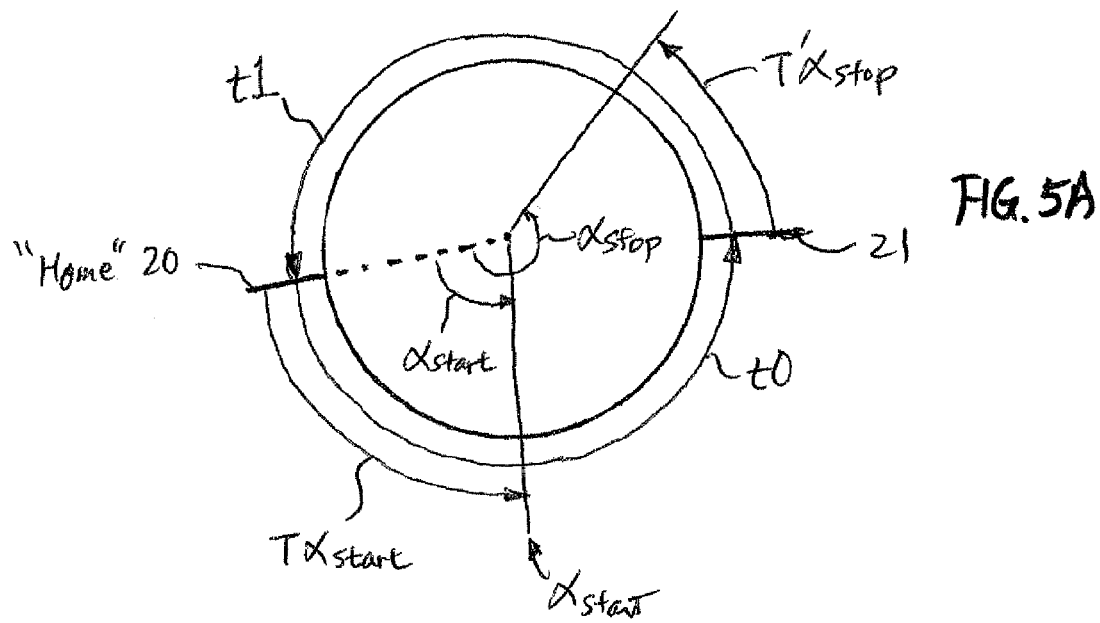
FIGS. 5A and 5B are schematic illustrations showing the relationship between the calibrated angles, $\alpha_{start}$ and $\alpha_{stop}$, and the time intervals $T\alpha_{start}$ and $T\alpha_{stop}$ according to another embodiment of the invention.
Figure 5B:
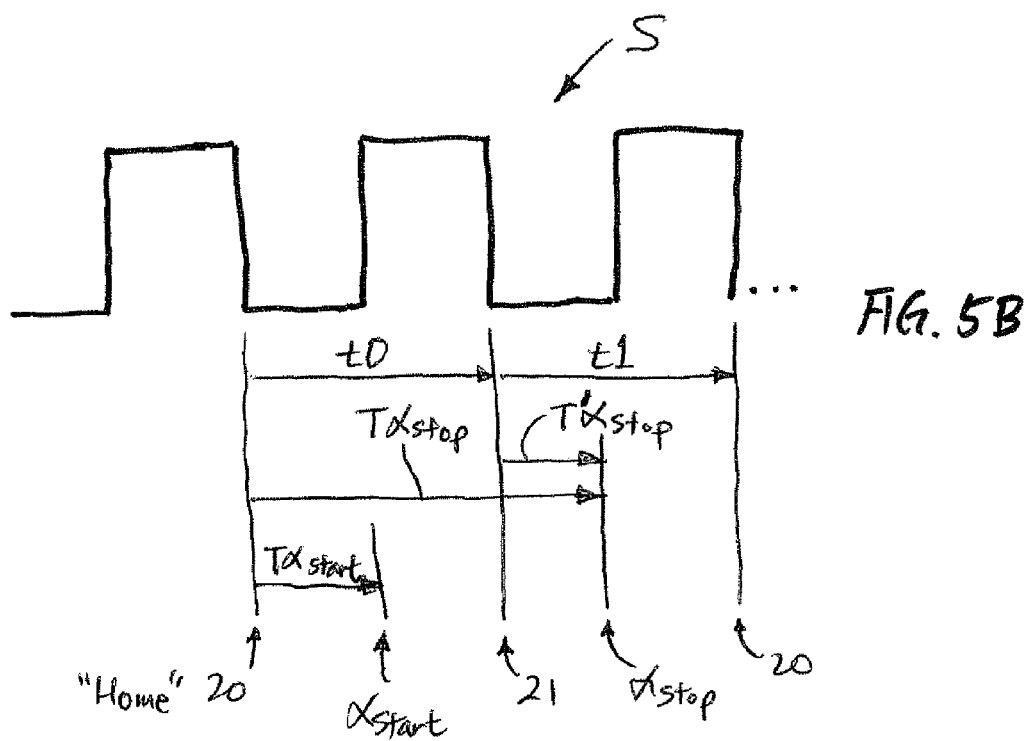

FIGS. 5A and 5B illustrate an example where the start/stop times represented by the calibrated angles, $\alpha_{start}$ and $\alpha_{stop}$, and the corresponding time intervals $T\alpha_{start}$ and $T\alpha_{stop}$ each fall in different pulses. In this example, because the time interval t0 is known, the interval $T\alpha_{stop}$ can be converted to $T\alpha_{stop}$ that can be measured from the edge transition point 21.

Figure 6:
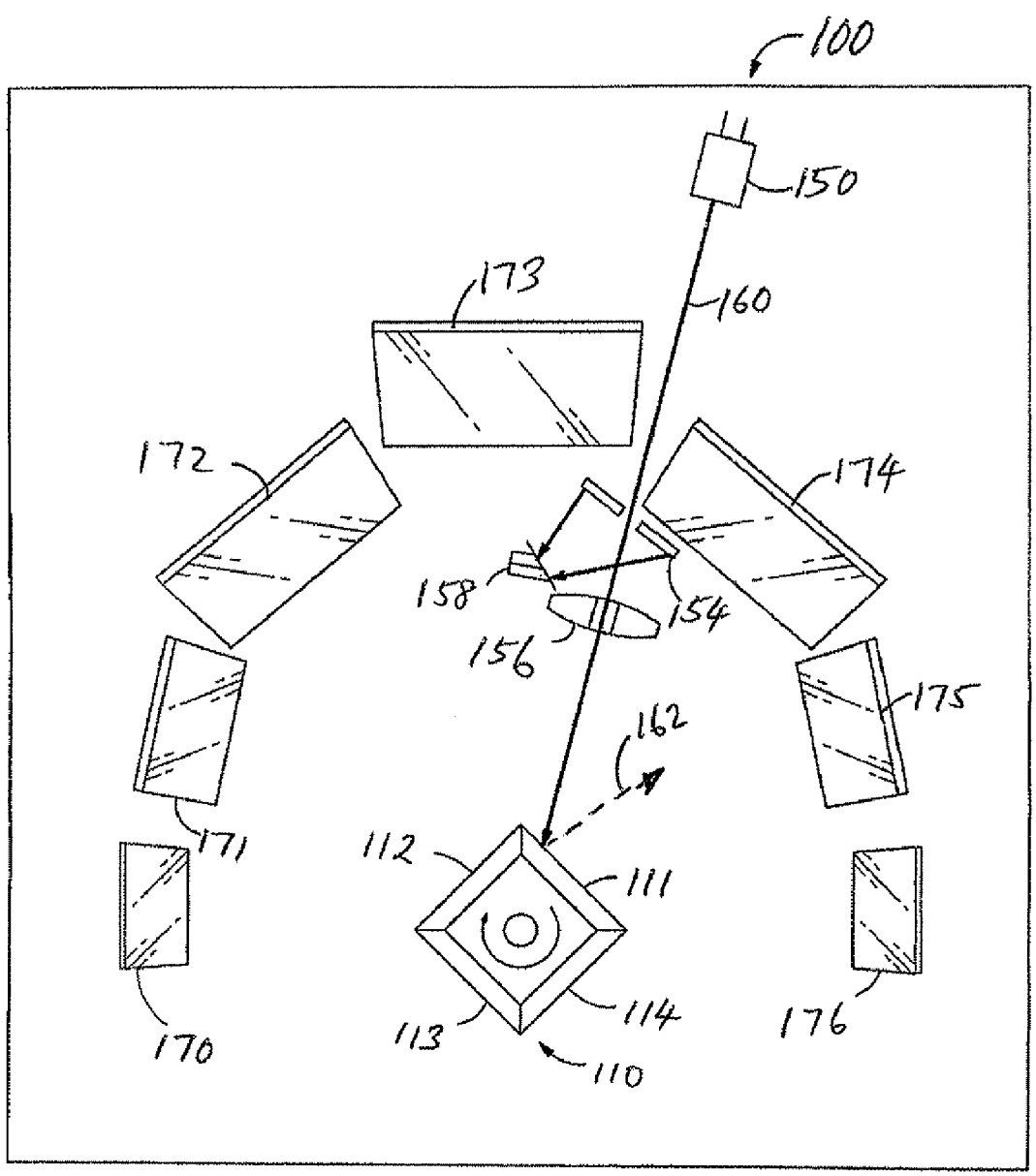
FIG. 6 is a schematic illustration showing a typical mirror arrangements in a multi-scan line barcode scanner utilizing a polygon mirror.

Thus, a set of particular start and stop times defined by a set of intervals $T\alpha_{start}$ and $T\alpha_{stop}$ can be used to selectively generate a scan line pattern. Thus, according to an aspect of the invention, the method described herein enables controlling a multiple-scan line barcode scanner to selectively turn on or project one scan line or any number and any particular combination of scan lines from the full complement set of the scan lines available in the scanner by selectively turning the scan beam source on and off at selected points in a full rotation of the polygon mirror. For example, if the particular multiple-scan line scanner's full scan pattern has 20 scan lines, the method described herein can be used to turn on (i.e. selectively project) any number of scan lines less than 20 and also allow any particular scan line or lines to be selectively turned on from that group of scan lines. As shown in FIG. 6, in a multiple-scan line barcode scanner utilizing a polygon mirror 110, as the polygon mirror 110 rotates, the reading scan beam 160 is reflected sequentially by the mirror facets 111, 112, 113 and 114. Each of the mirror facets 111, 112, 113 and 114 sweeps the reflected scan beam 162 through the down stream pattern mirrors 170, . . . 176 resulting in a discrete scan line pattern being projected into the scan volume by each of the down stream pattern mirrors 170, . . . 176. Additionally, each of the mirror facets 111, 112, 113 and 114 generally have different tilt angles so that the reflected scan beam from each of the mirror facets 111, 112, 113 and 114 impinge on the down stream pattern mirrors at different incident angles. This means that the polygon mirror 110 having four facet mirrors as shown in combination with the seven down stream pattern mirrors 170, . . . 176, will project 4×7 or 28 scan line patterns into the scan volume. By selecting a set of calibrated angles $\alpha_{start}$ and $\alpha_{stop}$ (and, thus the corresponding start and stop times for the scan beam source), that corresponds to a particular mirror facet's position directing the reflected scan beam 162 to a desired down stream pattern mirror, the multiple-scan line scanner 100 can be made to project a particular scan line among the set of 28 scan lines available. In another embodiment, the set of angles $\alpha_{start}$ and $\alpha_{stop}$ (and, thus the corresponding start and stop times for the scan beam source), can be selected so that the scan beam is illuminated for a duration that would produce only a portion of a particular scan line. By defining (during calibration process) and selecting multiple sets of start and stop times for turning the scan beam source on and off, the scanner can be controlled to project any one or more of the scan lines among the 28 scan lines available in the particular multiple-scan line barcode scanner 100.

Figure 7:
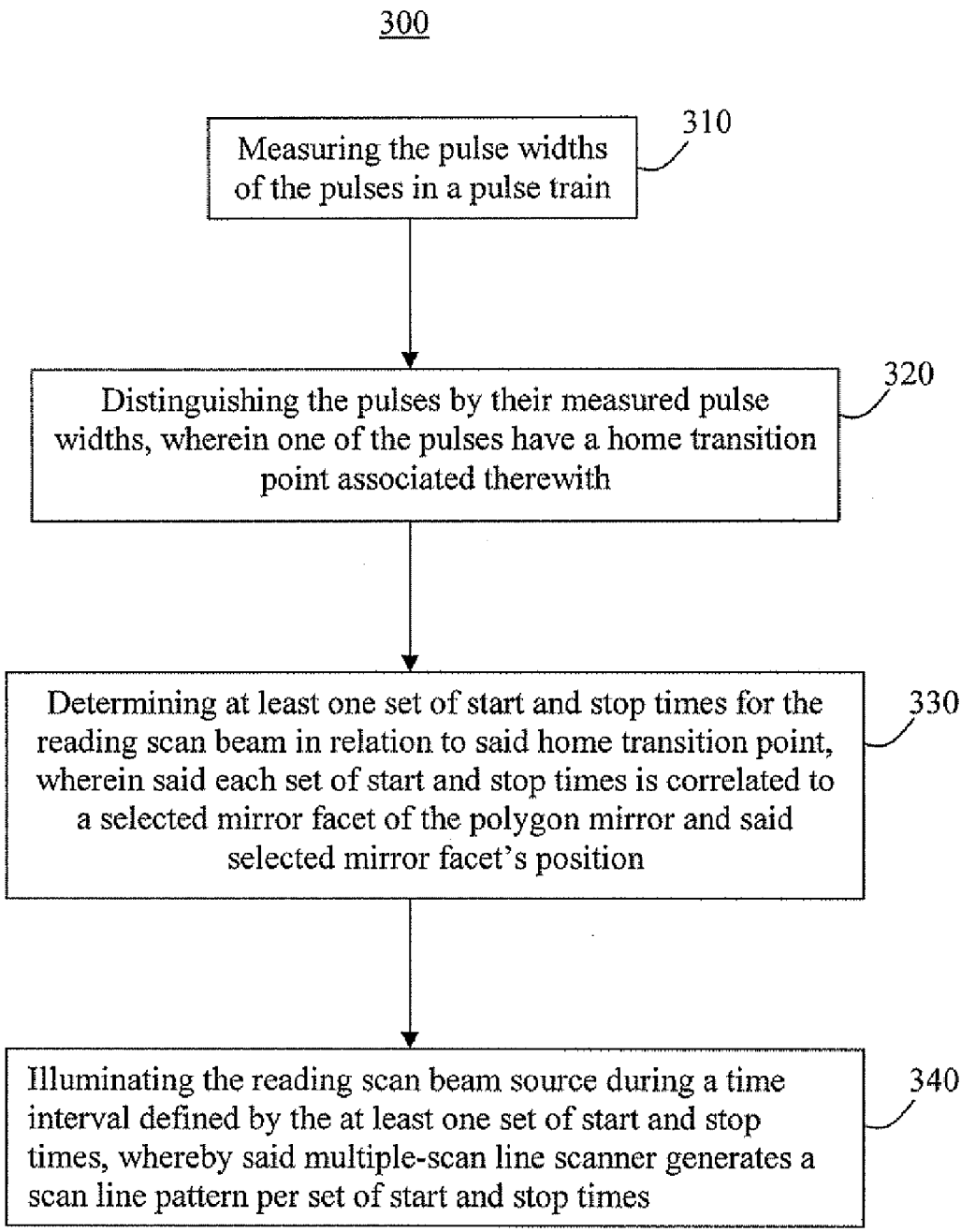
FIG. 7 is a flow chart showing a method according to an embodiment of the invention.

FIG. 7 is a flowchart 300 illustrating the method of selectively generating one or more scan lines from a multiple-scan line scanner having a rotating polygon mirror according to an embodiment of the invention. The polygon mirror is rotated by a motor and the scanner comprises a scan beam source generating a reading scan beam. The motor generates a signal pulse train comprising sequential sets of two or more binary signal pulses per revolution of the motor. Each of the pulses has a different pulse width that is a characteristic of the motor. The method includes measuring the pulse widths of the pulses in the pulse train generated by the motor driving the rotating polygon mirror of the barcode scanner (See box 310). Next, the pulses are distinguished by their measured pulse widths, wherein one of the pulses has a predetermined home transition point associated therewith (See box 320). Then, at least one set of start and stop times for turning the reading scan beam on and off are determined in relation to the home transition point, wherein the start and stop times are correlated to a selected mirror facet of the polygon mirror and the selected mirror facet's position (See box 330). Once the start and stop times are determined, the reading scan beam source is illuminated during a time interval defined by the at least one set of start and stop times (See box 340). This results in the multiple-scan line scanner generating a scan line pattern per set of start and stop times.

The method of generating a single-scan line is also applicable to a motor with more than two magnetic poles. In such motor, as with the two-pole example, a binary signal pulse is produced by the motor for each pole per revolution. Thus, for a motor with three poles, three signal pulses are output for each revolution of the motor. And as in the two-pole example discussed above, the scanner's microcontroller measures the pulse widths of the pulses to distinguish the three pulses.

However, because there are more than two pulses to distinguish from each other, identifying a particular magnet pole now requires determining either the largest pulse width or the shortest pulse width out of the three pulses (or the middle of the three pulse widths if desired) and using that pulse as the reference pulse used for defining the "home" transition point. Because there are more than two pulses to distinguish from one another, the previously described increment/decrement scheme using one hysteresis counter for the voting algorithm to filter out any variations in the time measurements in the two-pulse-per-revolution example would no longer be usable, and a different algorithm would be required. An example of such suitable algorithm is a histogram type algorithm. In this histogram type algorithm, a separate counter is used for each pulse measurement.

Figure 8:
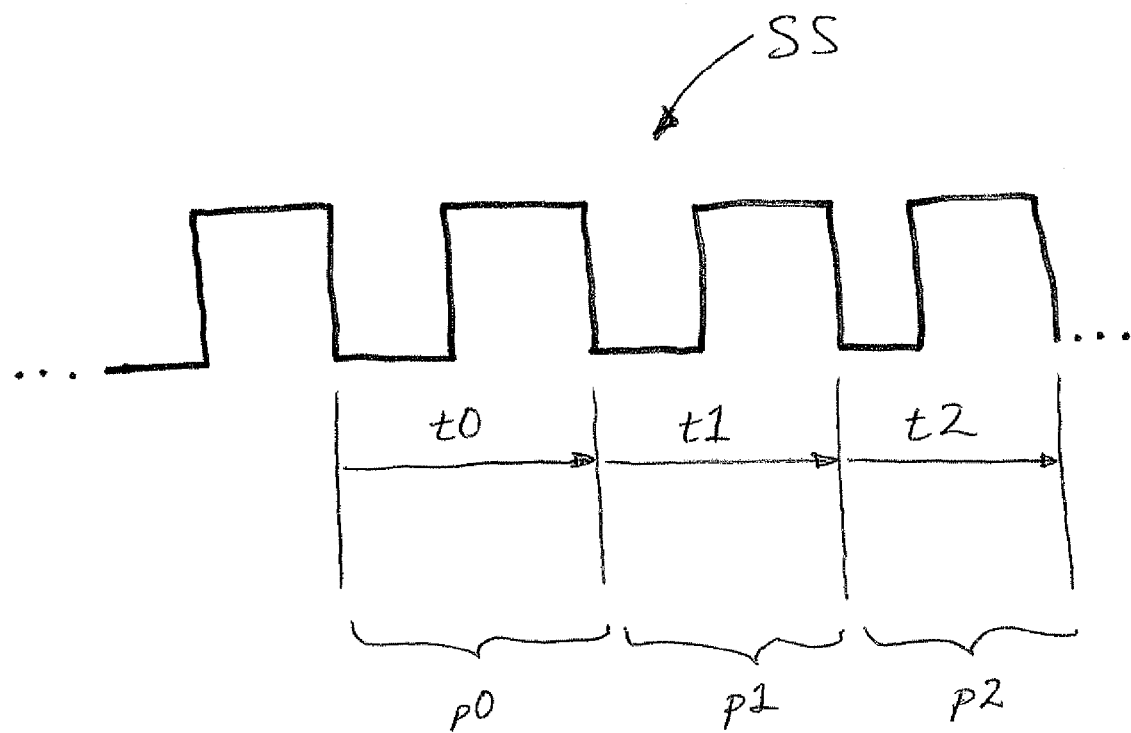
FIG. 8 is a schematic illustration of a signal pulse train produced by an exemplary three-pole motor.

Referring to FIG. 8, in the three-pole motor example, we will assume that upon power up of the motor, the first pulse measured is that begun by pole-0 and ended by pole-1 and will be referred to as pulse p0. The second pulse measured is that begun by pole-1 and ended by pole-2 and will be referred to as pulse pi. The third pulse measured is that begun by pole-2 and ended by pole-0 and will be referred to as pulse p2. As the motor begins to spin, the poles pass by the internal Hall Effect sensor in the following order:

motor startup: pole-1, pole-2, pole-0, pole-1, pole-2, pole-0, . . . and produces a corresponding signal pulse train SS that looks like:

p0, p1, p2, p0, p1, p2, p0, p1, . . .

The algorithm does not need to know which physical magnetic poles each of the pulses represent. The algorithm simply needs to identify which of the three pulses p0, p1, and p2 is either the shortest or the longest so that the "home" transition point in the pulse train can be determined.

The measured temporal pulse widths of the pulses p0, p1, and p2 are referred to as t0, t1, and t2, respectively. As described in connection with the two-pole motor example, because of the variances and tolerances in the manufacturing/assembly process for the motor, the three magnetic poles are not exactly positioned 120° apart from one another in the motor. And, thus the pulse widths t0, t1 and t2 will be different from one another. By measuring the pulse widths, the scanner can distinguish and identify the three poles that generated the three pulses widths t0, t1 and t2.

During the initial calibration of the scanner, one of the three identified poles are selected as the reference pole and one of the edge transition points (either the rising-edge transition point or the falling-edge transition point) of the pulse (the reference pulse) corresponding to that reference pole is arbitrarily designated as the "home" transition point. Then, the start/stop angles $\alpha_{start}$ and $\alpha_{stop}$ are determined in reference to the "home" transition point and stored in a storage device such as a memory unit of the scanner's microcontroller. The memory unit may be an integrated part of the microcontroller or a discrete memory device. As described above in reference to the two-pole motor example, the start/stop angles $\alpha_{start}$ and $\alpha_{stop}$ tells the microcontroller when to turn the reading scan beam source on and off in order to generate a single-scan line pattern.

Although the three pulses can be distinguished and identified by measuring the pulse widths t0, t1 and t2 one time, in practice, because of motor speed variability, the time measurements of the temporal pulse widths may not always be accurate. Thus, as with the two-pole motor example, a voting algorithm is applied over several or more measurements of the pulse widths to eliminate such inaccuracy. However, when there are more than two pulses per revolution to be measured, the voting algorithm utilizing increment/decrement scheme may need to be modified to accommodate the additional pulses. For example, a single hysteresis counter combined with a value indicating which pulse currently meets the desired condition (i.e., smallest, largest or the middle pulse width) can be used for the voting algorithm to attenuate the occasional measurement errors that may be encountered.

According to another embodiment, a voting algorithm utilizing a histogram scheme can be used where the motor has three or more poles and thus three or more pulses per revolution are measured. The histogram-based voting algorithm will be described using the 3-pole motor example. As the pulse width measurements are taken on the pulse train SS, the algorithm designates the first measurement 4000 clock units as t0 and inserts the pulse width measurements into a matrix as shown in TABLE 2 below:

TABLE 2

| Pulse Width Measurements | | | |
|---|---|---|---|
| | t0 for pulse p0 | t1 for pulse p1 | t2 for pulse p0 |
| 1$^{st}$ Revolution | 4000 | 4068 | 3891 |
| 2d Revolution | | | |
| 3d Revolution | | | |

The measurements from the first revolution of the motor are: 4000, 4068, and 3891 clock units completing a first set of measurements. The algorithm then begins to update a histogram, which also contains three slots corresponding to the three pulse width measurements. Every time the algorithm acquires a new measurement, it records it in the appropriate slot and finds the index of the slot holding the minimum value.

In this example, the software is configured to look for the pulse having the smallest pulse width. This is, however, arbitrary and in other embodiments of the invention, the software can be configured to look for the pulse having the largest pulse width. According to the first three pulse width measurements, the slot containing the t2 time holds the minimum value, so the algorithm could increment the corresponding counter in a histogram table as shown in TABLE 3 below by incrementing the counter-t2 corresponding to the pulse having the smallest measured pulse width:

TABLE 3

| Histogram | | | |
|---|---|---|---|
| | counter-t0 | counter-t1 | counter-t2 |
| 1$^{st}$ Revolution | 0 | 0 | 1 |
| 2d Revolution | | | |
| * | | | |
| * | | | |
| * | | | |
| Nth Revoloution | 134 | 0 | 53029 |
| N + 1 Revolution | 133 | 0 | 53030 |

To keep the numbers in the histogram table within a reasonable range, the algorithm could subtract "1" from every counter except for the one corresponding to the smallest measured pulse width on every iteration of measurements. The algorithm could also artificially limit all the values to lie between "0" and some maximum value (i.e. they would not overflow nor underflow).

If upon completion of some Nth iteration of measurements the histogram counters are as shown in TABLE 3 and the N+1 iteration of measurements indicates that the t2 time is the smallest, the algorithm would update the histogram by subtracting "1" from the counter-t0 and counter-t1 and adding "1" to counter-t2 as shown by the N+1 Revolution entry in TABLE 3.

The voting algorithms are not limited to the particular embodiments described herein and various other algorithms can be used for the voting algorithm to serve the same purpose of removing any sporadic measurement errors caused by motor speed variations. For example, in another embodiment, it is not necessary to store all of the measured pulse width values. The important part is that it is still possible to compare the measured pulse width values measured in a given revolution of the motor and to apply some form of hysteresis to make the determination stable, even if the measurements are very close to one another.

During the initial calibration of the barcode scanner having the three-pole motor of this example, the histogram of TABLE 3 would show that the t2 slot contains the largest value in the histogram. The software would then designate the third pulse p2 in the pulse train SS as the home reference pulse. Next, the start/stop times for turning the scan beam source on and off are defined by the start/stop angles $\alpha_{start}$ and $\alpha_{stop}$. These start/stop times are based off of the home reference pulse's "home" transition point. The "home" transition point can be designated as either the rising-edge transition point or the falling-edge transition point of the pulses in the pulse train. But, once designated during the calibration, it does not change unless the barcode scanner is recalibrated.

The method described herein can be implemented in a multiple-scan line barcode scanner without adding additional hardware since the method utilizes the binary signal pulse train output from the motor's internal Hall Effect sensor and the microprocessor of the barcode scanner can be used to time the pulse width intervals and identify the difference between the two pulses and position the start and stop points for the partial scan in the correct location. Thus, the implementation of the method described herein is an economical and novel way of enabling a single scan line operational mode in a multi scan line barcode scanner that generates accurately and repeatably positioned single scan line. The method can be implemented in a barcode scanner as a software program or a firmware program provided on a ROM.

What is claimed is:

1. In a laser scanning system including a laser source producing a laser beam that is scanned across a scanning field by a polygon mirror having mirror facets rotated by a DC multi-pole motor having a rotor with multiple magnet poles, and an internal Hall Effect sensor for sensing each magnet pole passing said internal Hall Effect sensor during each rotation of said rotor and generating a binary signal pulse for each sensed magnet pole, a method of determining an occurrence of a predetermined home transition point in said DC multi-pole motor, comprising the steps of:
 (a) rotating, said multi-pole rotor within said motor;
 (b) while said rotor is rotating, using said internal Hall effect sensor to generate a signal pulse train comprising sequential sets of two or more binary signal pulses for each revolution of said rotor;
 wherein each binary signal pulse has a time duration corresponding to a relative position of one said magnet pole;
 wherein, within a given revolution, each of said binary signal pulses has a pulse width that is different from pulse widths of other binary signal pulses generated by the other magnet poles, and these pulse width difference allow the binary signal pulses to be distinguished from each other during the revolution of said rotor; and
 wherein only one edge of one of said binary signal pulses is associated with said home transition point of said DC multi-pole motor; and
 (c) during each revolution of said multi-pole rotor, measuring the pulse widths of said binary signal pulses with appropriate accuracy to distinguish each said binary signal pulse by its said measured pulse width, tracking a ranking order of measured pulse widths of said binary pulse signals generated during each revolution of said rotor, and determining the occurrence of said predetermined home transition point associated with said DC multi-pole motor.

2. The method of claim 1, wherein during step (c), said measuring of the pulse widths of said binary signal pulses comprises using one or more hysteresis counters to keep track of the ranking order of measured pulse widths.

3. The method of claim 1, further comprising calibrating said DC multi-pole motor to determine said predetermined home transition point as a time offset from one edge of one of one of the previously identified said pulses.

4. The method of claim 1, which further comprises:
 (d) determining at least one set of start and stop times for turning on and off, said laser beam in relation to said predetermined home transition point;
 wherein said each set of start and stop times is correlated to a selected mirror facet of said rotating polygon mirror and the position of said selected mirror facet; and
 (e) driving said laser source during a time interval defined by said at least one set of start and stop times, so that said laser scanning system generates a scan line pattern for each set of start and stop times.

5. The method of claim 4, wherein said start and stop times are correlated to a selected mirror facet of said polygon mirror, and wherein the start and stop times are identified by respective start and stop time intervals and each interval measured from said predetermined home transition point.

6. A laser scanning system comprising: a DC multi-pole motor having (i) a rotor with multiple magnet poles, (ii) an internal Hall Effect sensor for sensing each magnet pole passing said internal Hall Effect sensor during each rotation of said rotor and generating a binary signal pulse having a pulse width that is different from pulse widths of other binary signal pulses generated by other magnetic poles, and (iii) a predetermined home transition point that is associated with only one of said binary signal pulses;
 a polygon mirror having mirror facets rotated by the rotor of said DC multi-pole motor;
 a laser source producing a laser beam that is scanned across a scanning field by the mirror facets of said rotating polygon mirror; a programmed microprocessor having an operating frequency; a timer circuit having a clock speed; an oscillator for controlling the operating frequency of said programmed microprocessor and the clock speed of said timer circuit;
 wherein while said rotor is rotating, said internal Hall effect sensor generates a signal pulse train comprising sequential sets of two or more binary signal pulses for each revolution of said rotor;
 one or more hysteresis counters, controlled by said timer circuit, for tracking a ranking order of measured pulse widths of said binary signal pulses generated during each revolution of said rotor;
 wherein each binary signal pulse has a time duration corresponding to a relative position of one said magnet pole;
 wherein, within a given revolution, each of said binary signal pulses has a pulse width that is different from the pulse widths of other binary pulse signals generated by the other magnet poles, and these pulse width differences allow the binary signal pulses to be distinguished from each other during the revolution of said rotor;
 wherein only one edge of one of said binary signal pulses is associated with said home transition point of said DC multi-pole motor; and
 wherein, during each revolution of said rotor, (i) said timer circuit measures the pulse widths of said binary signal pulses with appropriate accuracy so as to distinguish each said binary signal pulse by its said measured pulse width, (ii) said one or more hysteresis counters track the ranking order of measured pulse widths of said binary pulse signals generated during each revolution of said rotor, and (iii) said programmed microprocessor determines the occurrence of said predetermined home transition point associated with said DC multi-pole motor.

7. The laser scanning system of claim 6,
 wherein at least one set of start and stop times are determined for turning on and off said laser beam in relation to said predetermined home transition point;
 wherein said each set of start and stop times is correlated to a selected mirror facet of said rotating polygon mirror and the position of said selected mirror facet; and
 wherein said laser source is driven during a time interval defined by said at least one set of start and stop times, so that said laser scanning system generates a scan line pattern for each set of start and stop times.

8. The laser scanning system of claim 7, wherein said start and stop times are correlated to a selected mirror facet of said polygon mirror, and wherein the start and stop times are identified by respective start and stop time intervals and each interval measured from said predetermined home transition point.

* * * * *